US006243241B1

(12) United States Patent
Kanai (10) Patent No.: US 6,243,241 B1
(45) Date of Patent: Jun. 5, 2001

(54) SPIN VALVE MAGNETO-RESISTANCE EFFECT HEAD AND A MAGNETIC STORAGE APPARATUS USING THE SAME

(75) Inventor: Hitoshi Kanai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/095,414

(22) Filed: Jun. 10, 1998

(30) Foreign Application Priority Data

Jun. 10, 1997 (JP) .................................................. 9-152317

(51) Int. Cl.[7] ........................................................ G11B 5/39
(52) U.S. Cl. ...................... 360/324.11; 360/319; 360/320
(58) Field of Search ................................... 360/319, 320, 360/324, 324.1, 324.11

(56) References Cited

U.S. PATENT DOCUMENTS

| 5,661,620 | * | 8/1997 | Saito et al. ............................ 360/113 |
| 5,786,965 | * | 7/1998 | Saito et al. ............................ 360/113 |
| 5,818,684 | * | 10/1998 | Iwasaki et al. ...................... 360/113 |
| 5,828,530 | * | 10/1998 | Gill et al. ............................. 360/113 |
| 6,025,978 | * | 2/2000 | Hoshi et al. ......................... 360/113 |
| 6,034,847 | * | 3/2000 | Komuro et al. ..................... 360/126 |

FOREIGN PATENT DOCUMENTS

| 5567935 | 5/1980 | (JP) . |
| 490608 A2 | 12/1991 | (JP) . |
| 778314 | 3/1995 | (JP) . |

* cited by examiner

Primary Examiner—William Klimowicz
(74) Attorney, Agent, or Firm—Greer, Burns & Crain, LTD (57) ABSTRACT

A spin valve magneto-resistance effect head includes a spin valve film, a pair of magnetic shield members, and a support member. Each of the pair of magnetic shield members is arranged opposite to each surface of the spin valve film. The support member is arranged between the spin valve film and the pair of magnetic shield members for setting the relative position therebetween (D1>D2) in order to form a predetermined gap having non-conductivity therebetween. The change of resistivity based on giant magneto-resistance effect for signal magnetic field applied from a storage medium is output from the spin valve film as voltage drop in response to sense current applied from an outside. The antiferromagnetic layer is provided in order to magnetize the pinned layer to a direction orthogonal to the direction of the sense current by forming magnetic field by an exchange coupling to the pinned layer.

8 Claims, 9 Drawing Sheets

SPIN VALVE MAGNETO-RESISTANCE EFFECT HEAD AND A MAGNETIC STORAGE APPARATUS USING THE SAME

BACKGROUND OF THE INVENTION

1. Field of the Invention

The present invention relates to a spin valve magneto-resistance effect head for reading out the information stored in a magnetic storage medium by utilizing the magneto-resistance effect of a spin valve film. Further, the present invention relates to a magnetic storage apparatus using one or more spin valve magneto-resistance effect heads according to the present invention.

2. Description of the Related Art

In recent information processing apparatuses, for example, personal computers and others, the throughput of the apparatus is considerably improved so that a large quantity of multimedia data, such as sound data, animation data, etc., can be processed at very high speed. In order to provide a large throughput, it is required to realize a magnetic storage apparatus which can freely store and read a large quantity of information, for example, from several ten Giga bytes to several hundred Giga bytes, and which can be made at a low manufacturing cost.

On the other hand, a giant magneto-resistance (GMR) effect head is provided in order to reproduce high density data which are recorded in the magnetic storage medium in the magnetic disk apparatus. Particularly, a spin valve magneto-resistance effect head has a simplified structure, and has a high sensitivity, i.e., change of resistivity, for very small magnetic field. In general, the magneto-resistance effect can be expressed by change of resistivity in response to the magnetic field. That is, this head can convert the change of the signal magnetic field generated by the magnetic storage medium to a change in resistivity. The GMR effect head can provide very large read signal.

Accordingly, research and development of the spin valve magneto-resistance effect head have been performed in many manufacturing firms in order to put this type of head into practical use in magnetic storage apparatuses.

SUMMARY OF THE INVENTION

The primary object of the present invention is to provide a spin valve magneto-resistance effect head which can realize stable characteristics over a wide range of temperatures without large change in the structure of the head compared to the conventional art.

Another object of the present invention is to provide a magnetic storage apparatus using the spin valve magneto-resistance effect head according to the present invention.

In accordance with one aspect of the present invention there is provided a spin valve magneto-resistance effect head which includes:

a spin valve film formed by a non-magnetic layer, a pinned layer, a free layer and an antiferromagnetic layer, the non-magnetic layer consisting of non-magnetic substance, the pinned layer consisting of magnetic substance and formed to one surface of the non-magnetic layer, the free layer consisting of magnetic substance and formed to the other surface of the non-magnetic layer, and the antiferromagnetic layer formed to the other surface of the pinned layer, wherein change of resistivity based on giant magneto-resistance effect for a signal magnetic field applied from a storage medium is output from the spin valve film as voltage drop in response to a sense current applied from the outside;

a pair of magnetic shield members each of which is arranged opposite to each surface of the spin valve film for magnetically shielding the spin valve film from a magnetic field applied from the outside except for the signal magnetic field; and a gap isolation member arranged between the spin valve film and the pair of magnetic shield members for setting the relative position therebetween in order to form a predetermined gap having non-conductivity therebetween;

wherein the antiferromagnetic layer is provided in order to magnetize the pinned layer in a direction orthogonal to the direction of the sense current by forming a magnetic field by an exchange coupling to the pinned layer; and the support member supports the spin valve film so as to be arranged to a position deflected to one side of the magnetic shield member in such a way that the direction of leakage magnetic field applied to the spin valve film in accordance with magnetic field formed by the sense current has a component of magnetization in the direction of the pinned layer.

In accordance with another aspect of the present invention there is provided a spin valve magneto-resistance effect head which includes:

a spin valve film formed by a non-magnetic layer, a pinned layer, a free layer and an antiferromagnetic layer, the non-magnetic layer consisting of non-magnetic substance, the pinned layer consisting of magnetic substance and formed on one surface of the non-magnetic layer, the free layer consisting of magnetic substance and formed on the other surface of the non-magnetic layer, and the antiferromagnetic layer formed on the other surface of the pinned layer, wherein change of resistivity, based on the giant magneto-resistance effect, for signal magnetic field applied from a storage medium is output from the spin valve film as voltage drop in response to sense current applied from the outside;

a pair of magnetic shield members each of which is arranged opposite to each surface of the spin valve film for magnetically shielding the spin valve film from a magnetic field applied from the outside except for the signal magnetic field; and a gap isolation member arranged between the spin valve film and the pair of magnetic shield members for setting the relative position therebetween in order to form a predetermined gap having non-conductivity therebetween;

wherein the antiferromagnetic layer is provided in order to magnetize the pinned layer to a direction orthogonal to the direction of the sense current by forming a magnetic field by the exchange coupling to said pinned layer; and one magnetic shield member, in which the direction of leakage magnetic field applied to the spin valve film in accordance with magnetic field formed by the sense current has a component of magnetization direction of the pinned layer and has a relative magnetic permeability larger than that of the other magnetic shield member.

In a preferred embodiment, one magnetic shield member in the pair of magnetic shield members is the magnetic shield member in which the direction of the leakage magnetic field applied to the spin valve film has a component in the direction of the magnetic field formed by the sense current.

In another preferred embodiment, the pinned layer includes first and second pinned layers both consisting of the magnetic substance, and a relative distance (D1) between one surface of the second pinned layer and one magnetic shield member (110-1) is smaller than the relative distance (D2) between the same surface of the second pinned layer and the other magnetic shield member (110-2).

In still another embodiment, the spin valve film is formed by laminating the following layers in order. The layers include a capping layer (CL), a second free layer (SFL), a first free layer (FFL), a non-magnetic layer (NML), a second pinned layer (SPL), a first pinned layer (FPL), and an antiferromagnetic layer (AFM1); and both output terminals (51-1, 51-2) are provided from the second free layer through the capping layer.

In accordance with still another aspect of the invention, there is provided a magnetic storage apparatus having one or more spin valve magneto-resistive effect heads defined by claims 1 to 7, including:

a head supporting unit for supporting the heads in a floating state above surface of each magnetic storage medium which stores previously recorded information and position information, one of the recorded information and position information or both being read by the heads;

a servo control unit for reading the position information from the magnetic storage medium through one or any one of the heads, and for performing the positioning of one or all of the heads based on the position information; and a read unit for reading the recorded information from the magnetic storage medium through one or more heads positioned by the servo control unit.

DESCRIPTION OF THE PREFERRED EMBODIMENTS

Before describing the preferred embodiments, a conventional art and its problem will be explained, in detail, with reference to FIGS. 1 and 2.

Figure 1:
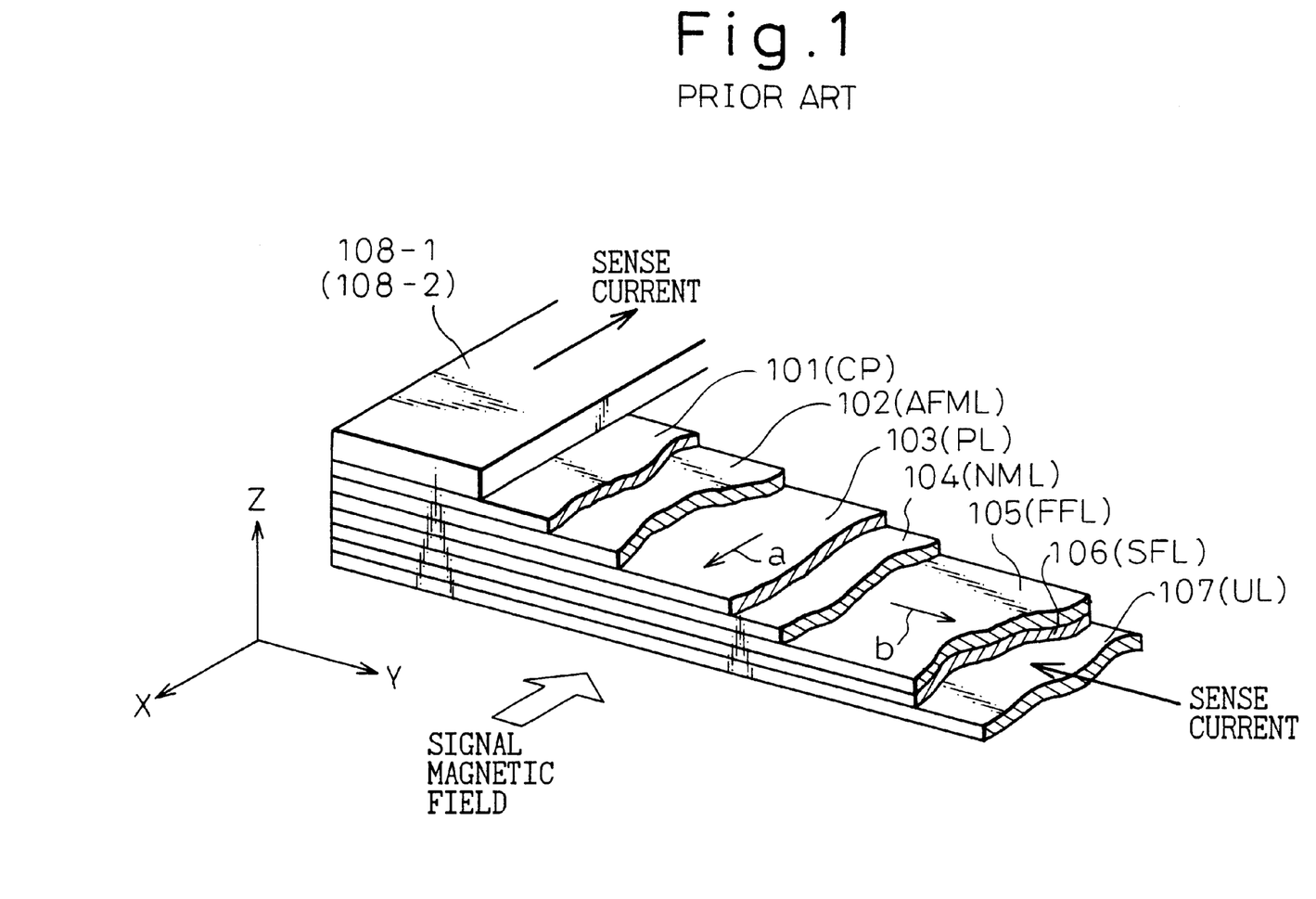
FIG. 1 is a schematic structural view of one example of the spin valve magneto-resistance effect head in a conventional art.
Figure 2:
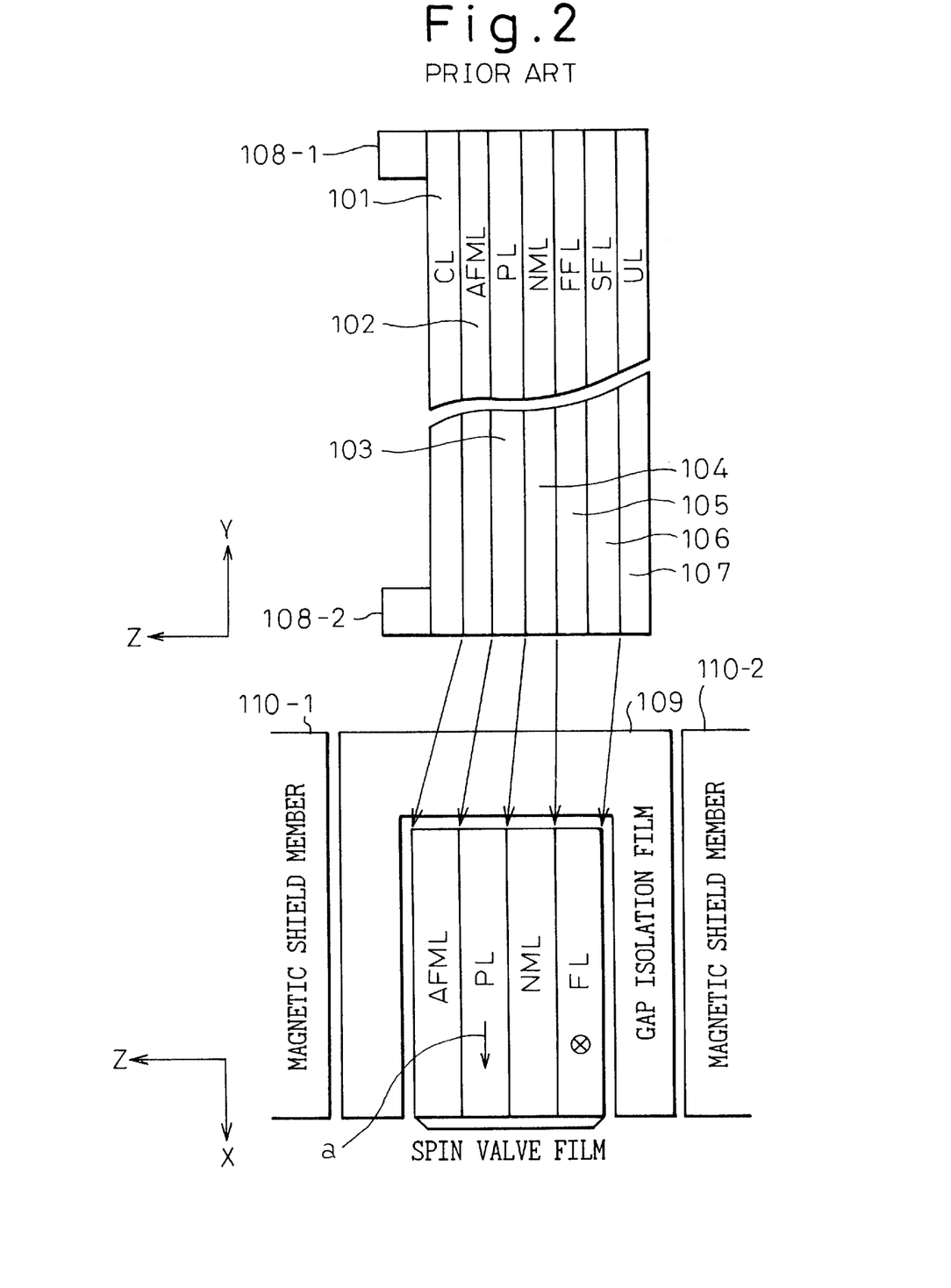
FIG. 2 is an explanatory view for explaining in detail the structure of FIG. 1.

FIG. 1 is a schematic structural view of one example of the spin valve magneto-resistance effect head in a conventional art, and FIG. 2 is an explanatory view for explaining, in detail, the structure of FIG. 1. In FIG. 1, reference number 101 denotes a capping layer (CP) preferably made by tantalum (Ta), 102 an antiferromagnetic layer (AFML), 103 a pinned layer (PL), 104 a non-magnetic layer (NML), 105 a first free layer (FFL), 106 a second free layer (SFL), 107 an under layer (UL), and 108-1 (108-2) a terminal.

The capping layer 101 is made in the shape of square plane. The spin valve film is formed by the antiferromagnetic layer 102 preferably made of FeMn, the pinned layer 103 preferably made of $Co_{90}Fe_{10}$, the non-magnetic layer 104 preferably made of Cu, the first free layer 105 preferably made of $Co_{90}Fe_{10}$ and the second free layer 106 preferably made of NiFe which are laminated on the capping layer 101.

Further, the under layer 107 preferably made of Ta is laminated on the second free layer 106. Electrodes 108-1 and 108-2 preferably made of Au are provided in parallel on two short sides of the capping layer 101 (In this drawing, one side of the capping layer 101 is omitted in order to simplify the drawing. Accordingly, only the electrode 108-1 is shown and the electrode 108-2 is omitted). The electrodes 108-1 and 108-2 are joined to the capping layer 101.

As shown in FIG. 2, the spin valve film is sandwiched by the gap isolation film preferably made of $Ai_2O_3$. The magnetic shield members 110-1 and 110-2, which are preferably made of NiFe, are provided to both sides of the gap isolation film 109 provided in parallel to both sides of the spin valve film.

In the above-mentioned conventional art, a predetermined sense current is applied from the outside to the capping layer (CL) 101, the antiferromagnetic layer (AFML) 102, the pinned layer (PL) 103, the non-magnetic layer (NML) 104, the first free layer (FFL) 105, the second free layer (SFL) 106 and the under layer (UL) 107, through the electrodes 108-1 and 108-2. In this case, the direction of the sense current is shown by the arrow marked "x" in FIG. 2. That is, the sense current is applied in the direction from the front to the back of FIG. 2.

The above-mentioned spin valve layer is magnetically divided into two parts, i.e., left and right sides, by using the non-magnetic layer 104. As shown by the arrow (a) in FIGS. 1 and 2, the pinned layer 103 is forcedly magnetized in the X-axis direction based on the magnetic field by the exchange coupling which is applied between the pinned layer 103 and the antiferromagnetic layer 104. Accordingly, the magnetization direction of the pinned layer 103 is maintained in constant state regardless of the intensity of the signal magnetic field which is applied by the magnetic storage medium.

However, in the forming process of the film of the first free layer 105, the first free layer 105 is magnetized to the Y-axis direction which is orthogonal to the magnetization direction of the pinned layer 103 as shown by the arrow (b) in FIG. 1, in the situation that the above signal magnetic field is not applied to the first free layer 105.

Further, the magnetization direction of the first free layer 105 rotates in accordance with the intensity of the signal magnetic field when it is applied to the first free layer 105. Further, the second free layer 106 is provided adjacent to the first free layer 105 so that the soft magnetization which is required by the first free layer 105 is maintained.

In the above structure, a total electric resistance value R of all layers, i.e., the capping layer 101-1 between the electrodes 108-1 and 108-2, the antiferromagnetic layer 102, the pinned layer 103, the non-magnetic layer 104, the first free layer 105, the second free layer 106 and the under layer 107, is proportional to a cosine value of an intersected angle which is obtained by intersecting the magnetization direction of the pinned layer 103 and the magnetization direction of the first and second free layers 105 and 106.

However, since these magnetization directions are orthogonal to one another when there is no signal magnetic field, the electric resistance value R varies linearly to the intensity of the signal magnetic field. Accordingly, it is possible to obtain the sense signal V(t) which gives an instantaneous value of the voltage, which is equal to a product of the electric resistance value R and the sense current, between the electrodes 108-1 and 108-2.

In the above-mentioned conventional art, however, when the antiferromagnetic layer 102 and the pinned layer 103 are heated by the Joule heat which occurs in accordance with the sense current, the magnetic field of the exchange coupling which is applied between these layers is disturbed since the heat energy is increased, and the exchange energy is suppressed between layers.

Further, in this situation, since the magnetization direction of the pinned layer 103 is not sufficiently fixed, the cosine value of the intersected angle is reduced and the sensitivity is also reduced. Further, since the linearity of the sense signal V(t) to the intensity of the signal magnetic field is deteriorated, the reliability of the reading from the head is also reduced.

Therefore, the present invention aims to solve the above-mentioned problems in the conventional art, and to provide an improved spin valve magnetic resistance effect head, and a magnetic storage apparatus using this type of head, which can maintain stable characteristics in a wide range of temperatures without a large change in structure of the head.

Figure 3:
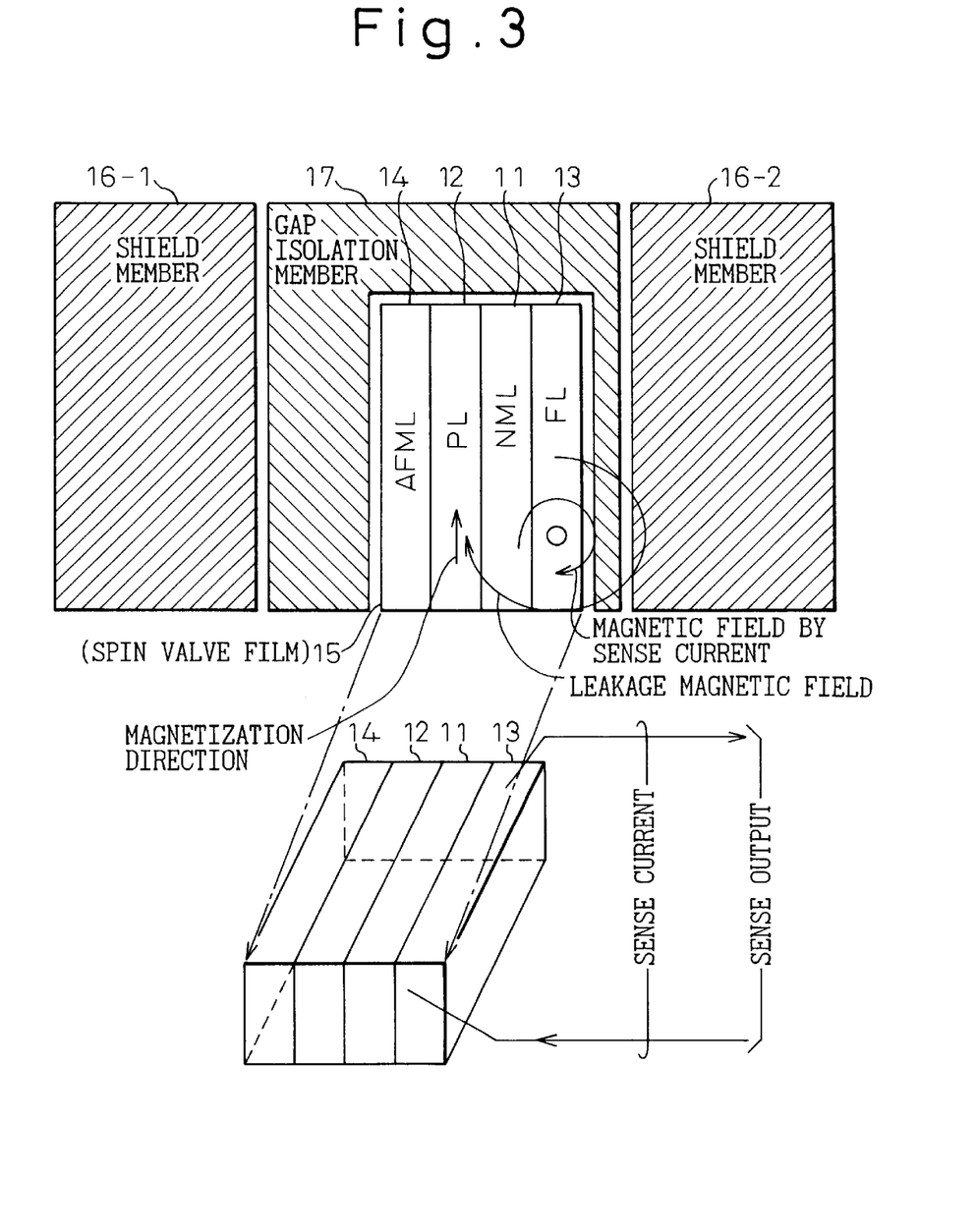
FIG. 3 is a basic block diagram of the spin valve magneto-resistance effect head defined in claims 1 to 7 of the present invention.
Figure 4:
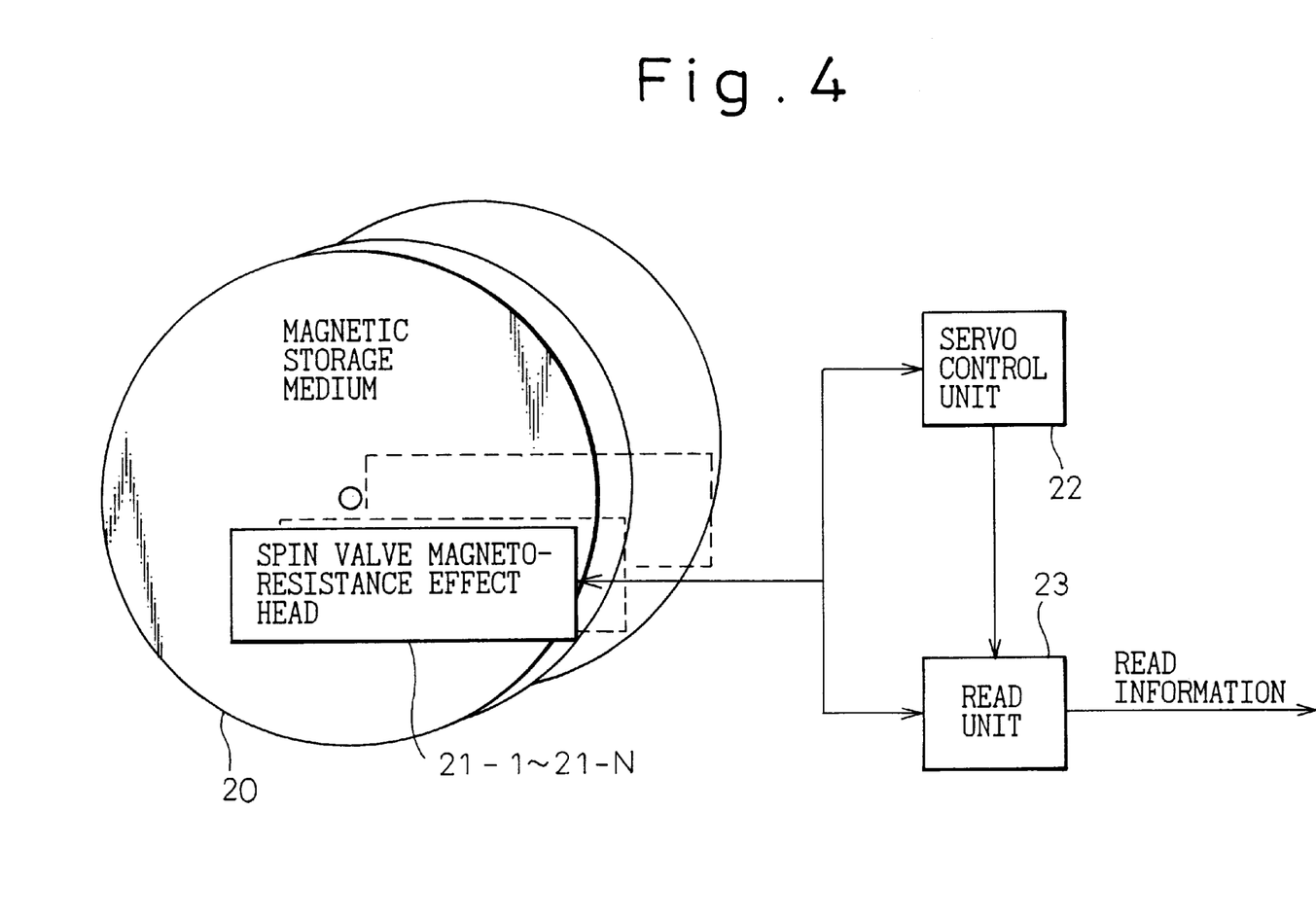
FIG. 4 is a basic block diagram of the spin valve magneto-resistance effect head defined in claim 8 of the present invention.

FIG. 3 is a basic block diagram of the spin valve magneto-resistance effect head. This drawing corresponds to the structure defined in claims 1 to 7 of the present invention. FIG. 4 is a basic block diagram of the spin valve magneto-resistance effect head. This drawing corresponds to the structure defined in claim 8 of the present invention.

According to the present invention, when the pinned layer 12 is heated by the Joule heat based on the sense current, the exchange coupling between the antiferromagnetic layer 14 and the pinned layer 12 is weakened. Accordingly, in this situation, the magnetization direction of the pinned layer 12 is not always maintained to a direction orthogonal to the direction of the sense current.

However, the gap isolation member 17 supports the spin valve film 15 at a position deflected to one side (i.e., an amount of offset) of the magnetic shielding member in which the direction of the leakage magnetic field applied to the spin valve film 15 in response to the magnetic field by the sense current has the component of the magnetization direction of the pinned layer 12, in the pair of magnetic shielding members 16-1 to 16-2.

That is, the pinned layer 12 is magnetized by the leakage magnetic field, which is applied by either magnetic shielding member 16-1 or 16-2, to the direction orthogonal to the direction of the sense current in the state which the exchange coupling is weakened.

Further, one magnetic shield member, in which the direction of leakage magnetic field applied to the spin valve film in accordance with magnetic field formed by the sense current has a component of magnetization direction of the pinned layer, has a relative magnetic permeability larger than that of the other magnetic shield member.

Accordingly, the giant magneto-resistance effect occurs stably in accordance with the signal magnetic field applied from the storage medium, and it is possible to read the information with high precision based on the giant magneto-resistance effect.

Figure 5:
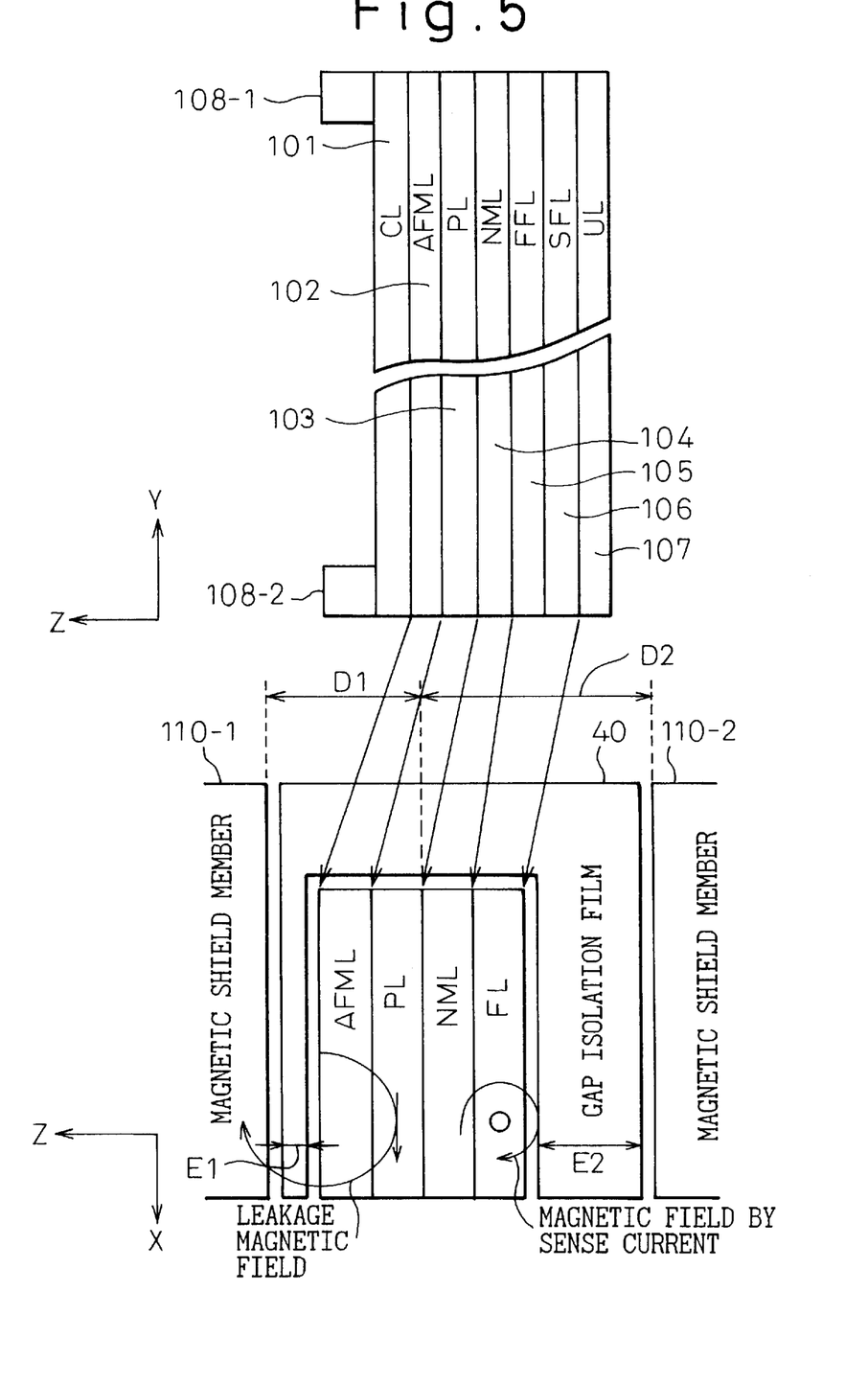
FIG. 5 shows a first embodiment of the basic structure of the spin valve magneto-resistance effect head defined in claims 1 to 7 of the present invention.

FIG. 5 shows a first embodiment of the basic structure of the spin valve magneto-resistance effect head defined in the claims of the present invention. The same reference numbers used in FIGS. 1 and 2 are attached to the same components in this drawing. The most important difference in structure between the present invention and the prior art shown in FIGS. 1 and 2, the gap isolation film 40 is provided instead of the gap isolation film 109.

The relationship between the basic structure of FIG. 3 and the embodiment of FIG. 5 is as follows. That is, the non-magnetic layer (NML) 104 in FIG. 5 corresponds to the non-magnetic layer (NML) 11 in FIG. 3, the pinned layer (PL) 103 corresponds to the pinned layer (PL) 12, the first free layer (FFL) 105 and the second free layer (SFL) 106 correspond to the free layer (FL) 13, and the antiferromagnetic layer (AFML) 102 corresponds to the antiferromagnetic layer (AFML) 14.

Further, the capping layer (CL) 101, the antiferromagnetic layer (AFML) 102, the pinned layer (PL) 103, the non-magnetic layer (NML) 104, the first free layer (FFL) 105, the second free layer (SFL) 106, the under layer (UL) 107 and the electrodes 108-1 and 108-2 correspond to the spin valve film 15. Still further, the magnetic shield members 110-1 and 110-2 correspond to the magnetic shield members 16-1 and 16-2, and the gap isolation film 40 corresponds to the gap isolation member 17.

Figure 6:
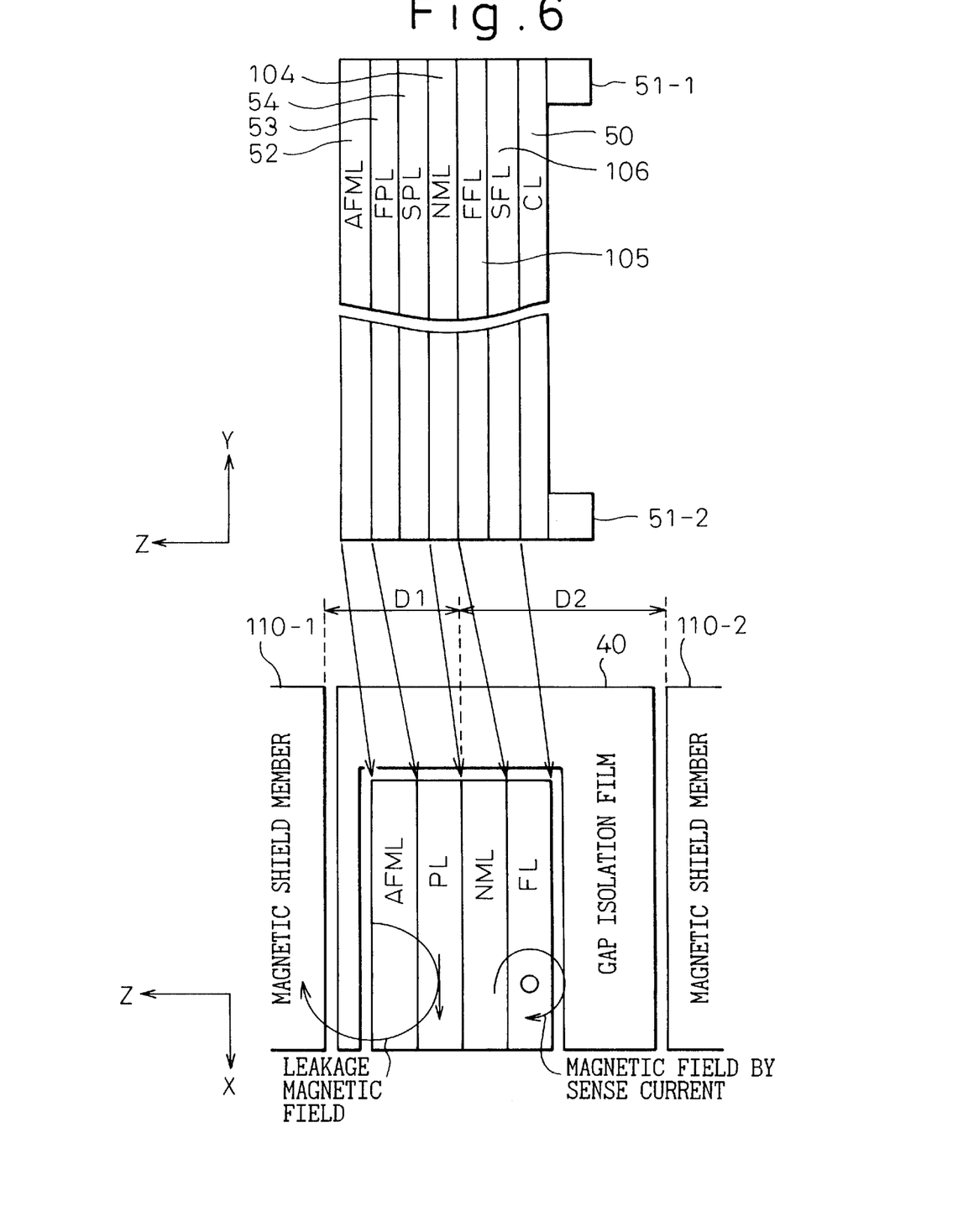
FIG. 6 shows a second embodiment of the basic structure of the spin valve magneto-resistance effect head defined in claims 1 to 7 of the present invention.

As shown in FIG. 5, D1 denotes the relative distance between the magnetic shield member 110-1 and the pinned layer PL (concretely, the surface of the second pinned layer 54 shown in FIG. 6), and D2 denotes the relative distance between the magnetic shield member 110-2 and the pinned layer PL (concretely, the same surface as above of the second pinned layer 54 shown in FIG. 6). The position of the pinned layer PL is fixed by the gap isolation film 40 so as to satisfy the following condition, i.e., the formula D1<D2. Further, the gap isolation film 40 is formed by a first gap isolation film and a second gap isolation film. The first and second gap isolation films are formed by laminating a plurality of films. In this embodiment, as shown in the drawing, a thickness (E1) of the first gap isolation film is smaller than the thickness (E2) of the second gap isolation film. In the manufacturing process of the spin valve magneto-resistance effect head, for example, first, the first gap isolation film is laminated, next, the spin valve film is laminated, and finally, the second gap isolation film is laminated.

That is, since the relative distance D1 is not equal to the relative distance D2, the magnetic shield member 110-1 is magnetized more than the magnetic shield member 110-2 by the clockwise magnetic field which is orthogonal to the direction of the sense current (indicated by the arrow of the thin annular line in the drawing).

Further, in this situation, the pinned layer PL is magnetized in the same direction as the conventional pinned layer 103 by the leakage magnetic field of the magnetic shield member 110-1.

That is, since the pinned layer 103 is magnetized by the exchange coupling between the antiferromagnetic layer 102 and the pinned layer 103, and also magnetized by the leakage magnetic field, the magnetization direction of the pinned layer 103 is maintained even if the exchange coupling between the antiferromagnetic layer 102 and the pinned layer 103 is weakened by the heat caused by the sense current.

According to this embodiment, it is possible to ensure the improved sensitivity and characteristics in a wide range of temperatures although it is very small change in structure compared to the conventional art.

Further, in this embodiment, although the antiferromagnetic layer 102 is formed by the same material, i.e., FeMn, as the conventional art, it is possible to use the following material, i.e., NiMn, PtMn, PdPtMn, CrMn and IrMn.

FIG. 6 shows a second embodiment of the basic structure of the spin valve magneto-resistance effect head defined in the claims of the present invention. The same reference numbers used in FIG. 5 are attached to the same components in this drawing. As shown in the drawing, the difference between the first and second embodiments are as follows.

That is, the capping layer (CL) 50 is formed instead of the under layer (UL) 107, and the electrodes 51-1 and 51-2 are provided instead of the electrodes 108-1 and 108-2 on the both short sides of the capping layer 50. Further, the capping layer (CL) 101 shown in FIG. 5 is eliminated in FIG. 6, and the antiferromagnetic layer 52 preferably made of NiO is provided instead of the antiferromagnetic layer 102.

Still further, the first pinned layer 53 preferably made of NiFe and the second pinned layer 54 preferably made of $Co_{90}Fe_{10}$ are provided instead of the pinned layer 103. In this case, the second pinned layer 54 is laminated in the direction of the non-magnetic layer 104 for the first pinned layer 53.

That is, in FIG. 6, the spin valve film is formed by laminating the following layers in order of a capping layer (CL), a second free layer (SFL), a first free layer (FFL), a non-magnetic layer (NML), a second pinned layer (SPL), a first pinned layer (FPL), and an antiferromagnetic layer (AFML). Both output terminals (51-1, 51-2) are provided from the second free layer through said capping layer.

In this embodiment, since the antiferromagnetic layer 52 is formed by the isolation substance, i.e., NiO, the electrodes 51-1 and 51-2 are joined on the both short sides of the capping layer 50 which is provided opposite side of the antiferromagnetic layer 52 for the non-magnetic layer 104.

Regarding the spin valve layer, as shown in FIG. 6, the direction and value of the current flowing through the electrodes 51-1 and 51-2 are similar to the first embodiment as shown in FIG. 5. Further, the magnetic shield members 110-1 and 110-2 and the relative distances D1 and D2 are also similar to the first embodiment as shown in FIG. 5.

According to the second embodiment, although the antiferromagnetic layer 52 is formed by the isolation substance, the change of the structure is very small and it is possible to ensure the sensitivity and characteristics over a wide range of temperatures.

Further, in the second embodiment, although the antiferromagnetic layer 52 is formed by the isolation substance NiO, for example, the antiferromagnetic layer 52 can also be formed by the isolation substance α Fe2O3. Further, it is possible to use the conductive substance, for example, NiMn, PtMn, PdMn, PdPtMn, CrMn, IrMn, etc., similar to the first embodiment of FIG. 5.

In the above explained first and second embodiments, as shown in FIGS. 5 and 6, the position of the spin valve layer is an one-side of the magnetic shield member 110-1. On the other hand, the magnetic flux density of the leakage magnetic field for magnetizing the pinned layer 103 (i.e., the first pinned layer 53 and the second pinned layer 54) is usually proportional to the proper relative magnetic permeability of the magnetic shield member 110-1.

Accordingly, even if the spin valve film is positioned the same relative distance from the magnetic shield members 110-1 and 110-2, it is possible to obtain the same effect as the first and second embodiments in such a way that the relative magnetic permeability μs-1 of the magnetic shield member at the side of the short distance (i.e., D1) is larger than the relative magnetic permeability μs-2 of the magnetic shield member at the side of the long distance (i.e., D2).

Figure 7:
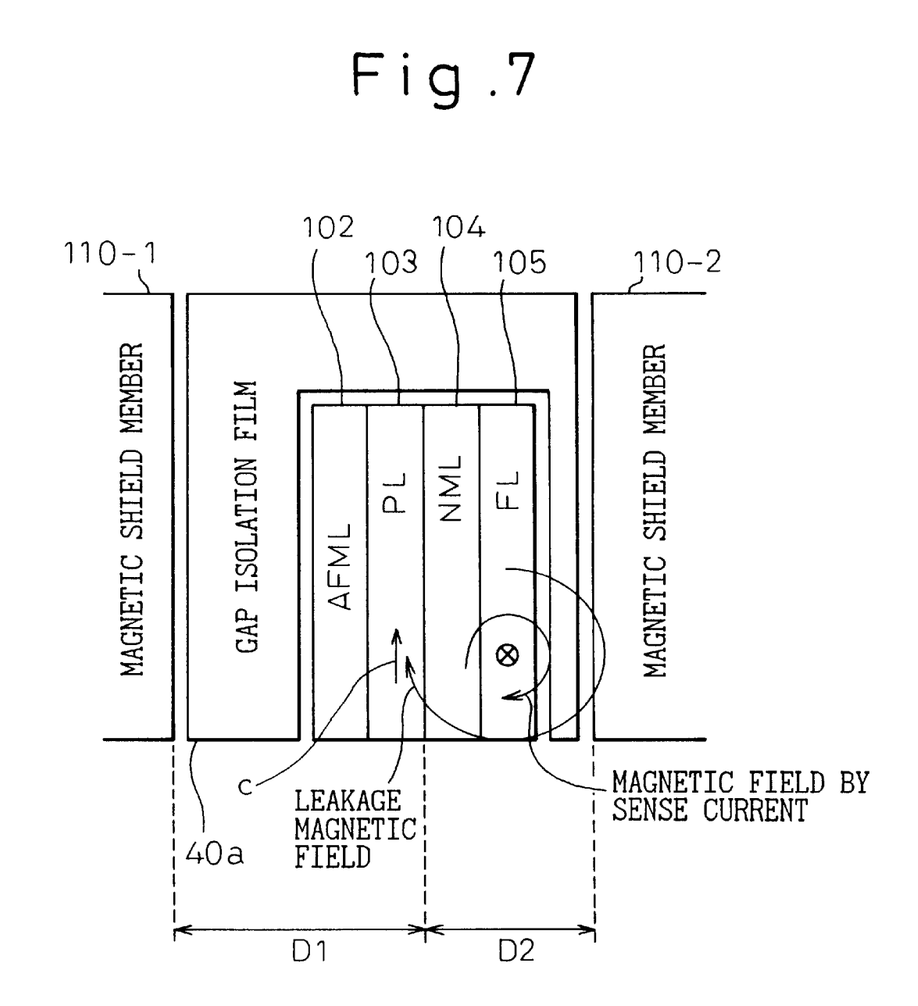
FIG. 7 shows a third embodiment of the basic structure of the spin valve magneto-resistance effect head defined in claims 3 and 4 of the present invention.

FIG. 7 shows a third embodiment of the basic structure of the spin valve magneto-resistance effect head defined in claims 3 and 4 of the present invention. The same reference numbers used in FIG. 7 are attached to the same components in this drawing. As shown in the drawing, the difference between the first and second embodiments are as follows. That is, the gap isolation film 40a is provided instead of the gap isolation film 40 of FIGS. 5 and 6, and the magnetization direction of the pinned layer (PL) 103 (the first pinned layer 53 and the second pinned layer 54) is set to the opposite direction as shown by the arrow (c).

In the third embodiment, similar to the first and second embodiments, D1 denotes the relative distance between the magnetic shield member 110-1 and the pinned layer PL, and D2 denotes the relative distance between the magnetic shield member 110-2 and the pinned layer PL. However, the position of the pinned layer PL is fixed by the gap isolation film 40a so as to satisfy the following condition, i.e., the formula D1>D2.

In this situation, as shown by the arrow of the thin annular line in the drawing, the direction of the magnetic field which is directly formed by the sense current coincides with the direction of the leakage magnetic field which is applied from the magnetic shield member 110-2 to the pinned layer 103 (i.e., the first pinned layer 53 and the second pinned layer 54) in accordance with the magnetic field.

Accordingly, according to the third embodiment, compared to the first and second embodiments, it is possible to increase the intensity of the magnetic field applied to the pinned layer (PL) 103 (i.e., the first pinned layer 53 and the second pinned layer 54) in order to compensate for the deterioration of the magnetic field by the exchange coupling, and to loosen the restrictions concerning the upper limit of the applicable sense current and the operational temperature.

As explained above, in the above embodiments, the direction of the leakage magnetic field which is applied to the pinned layer 103 (i.e., the first pinned layer 53 and the second pinned layer 54) coincides with the magnetization direction of the pinned layer to be magnetized based on the exchange coupling. However, if the magnetization based on the exchange coupling of the pinned layer is increased by the leakage magnetic field, it is not necessary to perfectly align the direction of the leakage magnetic field with the magnetization direction.

Figure 8:
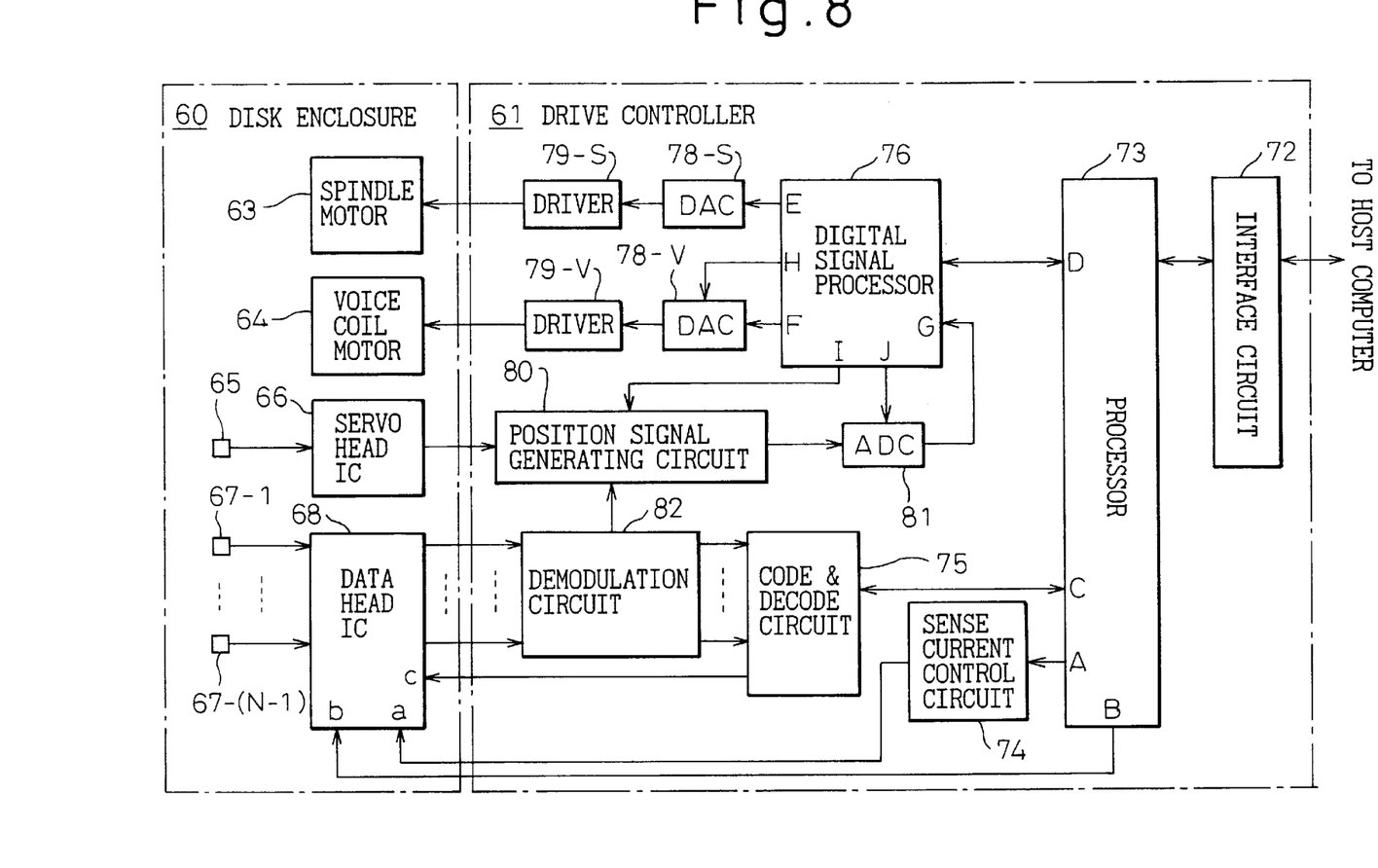
FIG. 8 shows a fourth embodiment of the basic structure of the magnetic storage apparatus using the spin valve magneto-resistance effect head according to the present invention.
Figure 9:
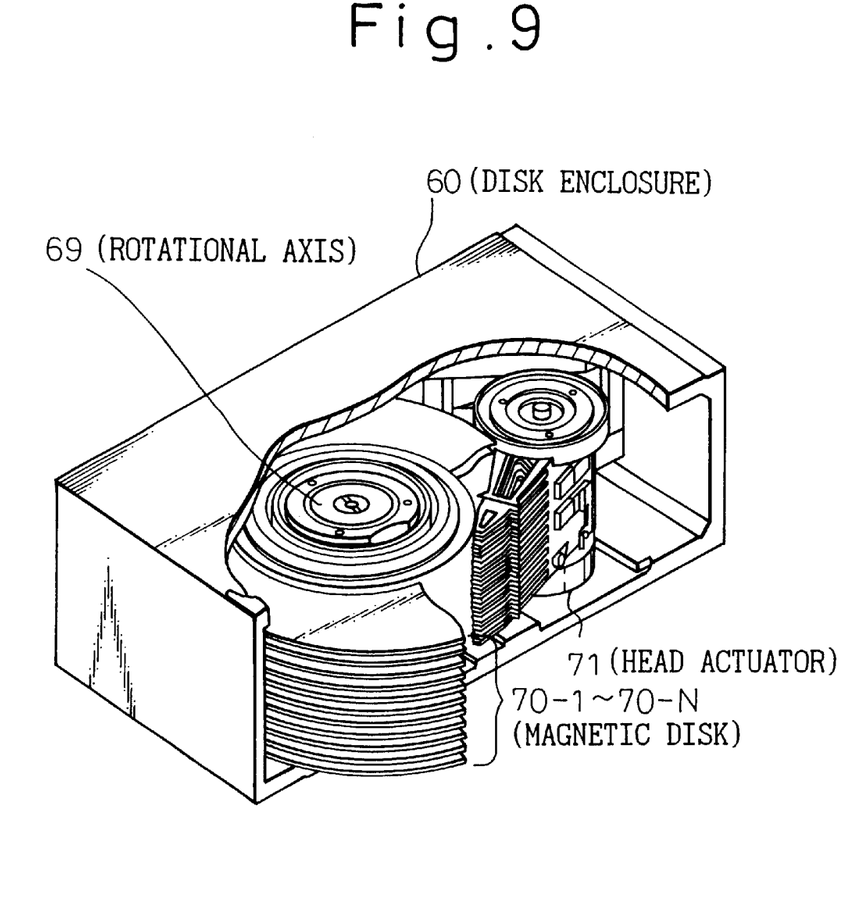
FIG. 9 is a schematic perspective view of a mechanical unit of a disk enclosure shown in FIG. 8.

FIG. 8 shows a fourth embodiment of the basic structure of the magnetic storage apparatus using the spin valve magneto-resistance effect head according to the present invention, and FIG. 9 is a schematic perspective view of a mechanical unit of a disk enclosure shown in FIG. 8. As shown in the drawing, the magnetic storage apparatus is formed by a disk enclosure 60 (a mechanical structure is shown in FIG. 9) and a drive controller 61.

As shown in the drawing, the disk enclosure 60 is formed by an electrical unit shown in FIG. 8 and a mechanical unit shown in FIG. 9. The electrical unit is formed by a spindle motor 63, a voice coil motor 64, a servo head 65, a servo head IC 66 connected to the servo head 65, a plurality of data heads 67-1 to 67-(N−1), a data head IC 68 connected in parallel to the plurality of data heads.

The mechanical unit of the disk enclosure 60 in FIG. 9 is mainly formed by a plurality of magnetic disks 70-1 to 70-N which are mounted to a rotational axis 69 of the spindle motor 63, and a head actuator 71 which is driven by the voice coil motor 64. Further, the servo head 65 and data heads 67-1 to 67-(N−1) (i.e., spin valve magnetic resistance effect heads of the present invention) are mounted to the end of the head actuator 71, and the position of the servo head 65 and data heads 67-1 to 67-(N−1) to the center axis of the rotational axis 69 are also set by the head actuator 71.

The drive controller 61 is formed by an interface circuit 72, a processor 73, a sense current control circuit 74, a code and decode circuit 75, a digital signal processor 76, a digital-to-analog converter (DAC) 78-S, a digital-to-analog converter (DAC) 78-V, a driver 79-S connected to the DAC 78-S, a driver 79-V connected to the DAC 78-V, a position signal generating circuit 80, and a demodulation circuit 82.

As shown in the drawing, the interface circuit 72 is provided between the processor 73 and a host computer (not shown) provided in an outside, a first output port A of the processor 73 is connected to a bias terminal (a) of the data head IC 68 through the sense current control circuit 74. A second output port B of the processor 73 is connected to a control input terminal (b) of the data head IC 68.

Further, a first input/output terminal C of the processor 73 is connected to an input and output terminal of the code and decode circuit 75, and a second input and output terminal D of the processor 73 is connected to an input and output terminal of the digital signal processor 76. A first output port E of the digital signal processor 76 is connected to a drive input of the spindle motor 63 through the DAC 78-S and the driver 79-S. A second output port F of the digital signal processor 76 is connected to a drive input of the voice coil motor 64 through the DAC 78-V and the driver 79-V.

An output of the servo head IC 66 is connected to an input port G of the digital signal processor 76 through the position signal generating circuit 80 and the digital-to-analog converter (ADC) 81, and a third output port H of the digital signal processor 76 is connected to a control input of the digital-to-analog converter 78-V. A fourth output port I and a fifth output port J of the digital signal processor 76 are connected to control inputs of the position signal generating circuit 80 and the analog-to-digital converter 81.

Each read output of the data head IC 68 is connected to the corresponding code input of the code and decode circuit 75 and a demodulation input of the position signal generating circuit 80 through the demodulation circuit 82. A decoded output of the code and decode circuit 75 is connected to a write input of the data head IC 68.

The relationship between the block diagram of FIG. 4 and this embodiment is as follows. That is, the magnetic disks 70-1 and 70-2 in FIG. 8 correspond to the magnetic storage medium 20 in FIG. 4, and the servo head 65 and data heads 67-1 to 67-(N−1) correspond to the spin valve magnetic resistance effect heads 21-1 to 21-N.

Further, the servo head IC 66, the position signal generating circuit 80, the analog-to-digital converter 81, the digital signal processor 76, the digital-to-analog converters 78-S and 78-V, the drivers 79-S and 79-V, the spindle motor 63, the voice coil motor 64 and the head actuator 71 correspond to the servo control unit.

Still further, the data head IC 68, the demodulation circuit 82, the code and decode circuit 75, the sense current control circuit 74 and the processor 73 correspond to the read unit 23.

The operation of the magnetic storage apparatus in FIGS. 8 and 9 will be explained in detail below.

Of surfaces of magnetic disks 70-1 and 70-N, one of the magnetic disks is provided as the servo surface which is accessed by the servo head 65. The servo patterns are written to the servo surface so that each of servo patterns individually corresponds to each of cylinders. In this case, the servo pattern is applied by a servo-surface servo method. Further, in this method, the phase pattern is obtained in such a way that, when the displacement to the normalized cylinder is large, the phase of the sense output obtained by the servo head 65 is shifted in a predetermined direction.

Further, in surfaces of magnetic disks 70-1 and 70-N, the sector areas, each sector area being provided by dividing the data track in each magnetic disk, are accessed by the data heads 67-1 to 67-(N−1). Further, the position data (i.e., sector servo pattern used by a sector servo method) is previously written into each sector area.

Still further, the processor 73 activates the sense control circuit 74 when it starts, and the sense current control circuit 74 supplies a constant sense current to each of data heads 67-1 to 67-(N−1) through the data head IC. Further, the same sense current as the above is applied to the servo head 65 through the servo head IC 66.

Still further, when an instruction is applied from the host computer to the processor 73 through the interface circuit 72, the processor 73 requests the drive of the spindle motor 63 to the digital signal processor 76. Since the digital signal processor 76 drives the spindle motor 63 through the digital-to-analog converter 78-S and the driver 79-S, the magnetic disks 70-1 to 70-N rotate around rotational axis of the spindle motor 63. When the magnetic disks 70-1 to 70-N rotate in a normal state, the servo heads 65 and data heads 67-1 to 67-(N−1) receive a constant floating force caused by the air flow which occurs at the surface of each of magnetic disks 70-1 to 70-N, and act as floating heads while maintaining a constant distance from the surface (In this case, the distance is determined based on the storage density required to the surface of the magnetic disk and on the sensitivity of the head).

In this situation, the servo head 65 reads the above-mentioned servo pattern, and applies that servo pattern to the position signal generating circuit 80 through the servo head 66.

Further, data heads 67-1 to 67-(N−1) read in parallel the sector servo patterns which are previously recorded to the surface of each of magnetic disks 70-1 to 70-N, and apply these sector servo pattern to position signal generating circuit 80 through the data head IC 68 and the demodulation circuit 82.

When the processor 73 receives an identification information of the cylinder to be accessed, the track and the sector to be accessed, and access format (i.e., "write operation", "read operation", etc.) from the host computer, the processor 73 applies the identification information and the format to the position signal generating circuit 80 through the digital signal processor 76.

The position signal generating circuit 80 generates the position signal indicating the deflection (offset) of the position of the head based on the servo pattern applied through the servo head 65 and the servo head IC 66, when the format indicates the seeking operation to the new cylinder.

On the other hand, when that format indicates the access to any track and cylinder belonging to the same cylinder (track) as previously sought, the position signal generating circuit 80 generates position signal indicating the deflection of the position of the head based on the sector servo pattern applied through the data head IC 68 and the demodulation circuit 80 for the corresponding data head in the data heads 67-1 to 67-(N−1).

The digital signal processor 76 drives the voice coil motor 64, in a direction in which the deflection of the position of the head indicated by these position signal is suppressed, through the digital-to-analog converter 78-V and the driver 79-V. The voice coil motor precisely sets the position of the servo head 65 and the data heads 67-1 to 67-(N−1) to the desired track and sector through the head actuator 71 in accordance with the above-mentioned control.

In the process of the above-mentioned position control of the servo head 65 and the data heads 67-1 to 67-(N−1), the digital signal processor 76 performs the logical calculation and mathematical calculation based on the algorithm adapted to the position of each head, which changes every moment, the identification information, and the format. Further, the digital signal processor 76 drives the spindle motor 63 and the voice coil motor 64 in accordance with the result of the calculations.

The code and decode circuit 75 receives the pulse signal indicating the data string of the information, which are read in parallel by the data head 67-1 to 67-(N−1), from the magnetic disks 70-1 to 70-N. Further, the code and decode circuit 75 synchronously performs the equalization process and the decoding process to these pulse signals and applies the processed pulse signals to the processor 73.

When the format indicates "read operation", the processor 73 receives any pulse signal contained in these pulse signals, which corresponds to the cylinder, the track and the sector indicated by the identification information and the format from the host computer. Further, the processor 73 applies the pulse signal to the host computer through the interface circuit 72.

As explained above, since the spin valve magneto-resistance effect head according to the present invention is mounted to each of the servo head 65 and data heads 67-1 to 67-(N−1) which access the magnetic disks 70-1 to 70-N, it is possible to realize the positioning of the head at read operation therefrom at high precision in a wide range of temperatures without a large restriction on the value of the sense current, the material of the spin valve film, and the mechanical shape and size.

In the above embodiment, although the servo surface servo method and the sector servo method are used jointly, the present invention is not restricted to this structure, and it is possible to use any one of these methods. Further, in the above embodiment, although the number of the magnetic disks 70-1 to 70-N is not shown concretely, the number of the magnetic disks 70-1 to 70-N is not restricted to the plural number. That is, when the positioning of the head is performed only based on the sector servo method, the number of the magnetic disks 70-1 to 70-N may be 1.

In the above embodiment, although the magnetic disks 70-1 to 70-N are previously mounted to the disk apparatus, it is possible to form the magnetic disks 70-1 to 70-N so as to be detachable.

In the above embodiment, although the spin valve magneto-resistance effect head according to the present invention is used to each of servo head 65 and data heads 67-1 to 67-(N−1), it is possible to use this head for any one of the servo head and data head.

According to the present invention, first, it is possible to realize the stable read operation of the head without a large change in structure of the head, second, it is possible to realize stable sensitivity and characteristics at the read operation of the head for the sense current and temperature, third, it is possible to loosen the restriction on the value of the sense current and to realize the positioning and read operation of the head at high precision over a wide range of temperatures.

Therefore, it is possible to suppress the increase of the manufacturing cost and to obtain high performance and reliability in the magnetic apparatus using the spin valve magneto-resistance effect head according to the present invention.

What is claimed is:

1. A spin valve magneto-resistance effect head, comprising:

a spin valve film formed by a non-magnetic layer, a pinned layer, a free layer and an antiferromagnetic layer, said non-magnetic layer consisting of non-magnetic substance, said pinned layer consisting of magnetic substance and formed to one surface of said non-magnetic layer, said free layer consisting of magnetic substance and formed to the other surface of said non-magnetic layer, and said antiferromagnetic layer formed to the other surface of said pinned layer, wherein a change of resistivity based on giant magneto-resistance effect for a signal magnetic field applied from a storage medium is output from said spin valve film as voltage drop in response to sense current applied from outside;

a pair of magnetic shield members each being arranged opposite to each surface of said spin valve film, for magnetically shielding said spin valve film from a magnetic field applied from outside except for said signal magnetic field; and a gap isolation member arranged between said spin valve film and the pair of magnetic shield members for setting the relative position therebetween in order to form a predetermined gap having non-conductivity therebetween;

wherein said antiferromagnetic layer is provided in order to magnetize said pinned layer in a direction orthogonal to the direction of said sense current by forming a magnetic field by an exchange coupling to said pinned layer; and said gap isolation member supports said spin valve film so as to be arranged to a position deflected to one side of said magnetic shield member in such a way that the direction of leakage magnetic field applied to said spin valve film in accordance with magnetic field formed by said sense current has a component of magnetization direction of said pinned layer.

2. A spin valve magneto-resistance effect head, comprising:

a spin valve film formed by a non-magnetic layer, a pinned layer, a free layer and an antiferromagnetic layer, said non-magnetic layer consisting of non-magnetic substance, said pinned layer consisting of magnetic substance and formed to one surface of said non-magnetic layer, said free layer consisting of a magnetic substance and formed to the other surface of said non-magnetic layer, and said antiferromagnetic layer formed to the other surface of said pinned layer, wherein a change of resistivity based on giant magneto-resistance effect for a signal magnetic field applied from a storage medium is output from said spin valve film as voltage drop in response to sense current applied from outside;

a pair of magnetic shield members, each being arranged opposite to each surface of said spin valve film, for magnetically shielding said spin valve film from a magnetic field applied from outside except for said signal magnetic field; and a gap isolation member arranged between said spin valve film and the pair of magnetic shield members for setting the relative position therebetween in order to form a predetermined gap having non-conductivity therebetween;

wherein said antiferromagnetic layer is provided in order to magnetize said pinned layer in a direction orthogonal to the direction of said sense current by forming a magnetic field by an exchange coupling to said pinned layer; and one magnetic shield member, in which the direction of leakage magnetic field applied to said spin valve film in accordance with magnetic field formed by said sense current has a component of magnetization direction of said pinned layer, has a relative magnetic permeability larger than the relative magnetic permeability of the other magnetic shield member.

3. A spin valve magneto-resistance effect head, as claimed in claim 1, wherein one magnetic shield member in the pair of magnetic shield members is the magnetic shield member in which the direction of the leakage magnetic field applied to the spin valve film has a component of the direction of the magnetic field formed by the sense current.

4. A spin valve magneto-resistance effect head, as claimed in claim 2, wherein one magnetic shield member in the pair of magnetic shield members is the magnetic shield member in which the direction of the leakage magnetic field applied to the spin valve film has a component of the direction of the magnetic field formed by the sense current.

5. A spin valve magneto-resistance effect head, as claimed in claim 1, wherein said pinned layer comprises a first and second pinned layers both consisting of the magnetic substance and a relative distance (D1) between one surface of the second pinned layer and one magnetic shield member (110-1) is smaller than the relative distance (D2) between the same surface of the second pinned layer and the other magnetic shield member (110-2).

6. A spin valve magneto-resistance effect head, as claimed in claim 5, wherein the spin valve film is formed by laminating the following layers in order of a capping layer (CL), a second free layer (SFL), a first free layer (FFL), a non-magnetic layer (NML), a second pinned layer (SPL), a first pinned layer (FPL), and an antiferromagnetic layer (AFML); and both output terminals (51-1, 51-2) are provided from the second free layer through said capping layer.

7. A spin valve magneto-resistance effect head, as claimed in claims 1 or 2, said gap isolation member comprises first and second gap isolation members, and a thickness (E1) of the first gap isolation member is smaller than the thickness (E2) of the second gap isolation member.

8. A magnetic storage apparatus having one or more spin valve magneto-resistive effect heads, defined by any one of claims 1 to 6, comprising:

a head supporting unit for supporting said heads in floating state above the surface of each magnetic storage medium which stores previously recorded information and position information, one of the recorded information and position information or both being read out by said heads;

a servo control unit for reading the position information from the magnetic storage medium through one or any one of said heads, and for performing the positioning of one or all of said heads based on the position information; and a read unit for reading the recorded information from the magnetic storage medium through one or more heads positioned by said servo control unit.

* * * * *